(12) United States Patent
Pardo Holtheuer et al.

(10) Patent No.: US 12,275,870 B2
(45) Date of Patent: Apr. 15, 2025

(54) METHOD FOR PRODUCING A NATURAL FORMALDEHYDE-FREE ADHESIVE FOR WOOD PANELS

(71) Applicant: INVESTIGACIONES FORESTALES BIOFOREST S.A., Concepción (CL)

(72) Inventors: Simón Pardo Holtheuer, San Pedro de la Paz (CL); Bruno Gorrini Belmar, Concepción (CL); Karol Peredo Morales, San Pedro de la Paz (CL); Álvaro Mauricio González Vogel, San Pedro de la Paz (CL)

(73) Assignee: INVESTIGACIONES FORESTALES BIOFOREST S.A., Concepción (CL)

( * ) Notice: Subject to any disclaimer, the term of this patent is extended or adjusted under 35 U.S.C. 154(b) by 550 days.

(21) Appl. No.: 17/587,967

(22) Filed: Jan. 28, 2022

(65) Prior Publication Data

US 2022/0275263 A1  Sep. 1, 2022

(30) Foreign Application Priority Data

Feb. 2, 2021 (CL) .................................. 2021-272

(51) Int. Cl.
 *C09J 189/00* (2006.01)
 *C08J 3/24* (2006.01)
(52) U.S. Cl.
 CPC ............... *C09J 189/00* (2013.01); *C08J 3/24* (2013.01); *C08J 2389/00* (2013.01)
(58) Field of Classification Search
 None
 See application file for complete search history.

(56) References Cited

U.S. PATENT DOCUMENTS

| 2009/0258042 A1* | 10/2009 | Anastasiou | A61K 8/41 |
| | | | 424/59 |
| 2015/0086775 A1* | 3/2015 | Allen | C09D 189/00 |
| | | | 428/326 |
| 2017/0107411 A1* | 4/2017 | Zhao | C08G 18/6484 |

FOREIGN PATENT DOCUMENTS

| CN | 107641495 A * | 1/2018 | |
| CN | 107722924 A * | 2/2018 | ......... C08G 16/0293 |
| CN | 109135664 A * | 1/2019 | ............. C09J 11/04 |

(Continued)

OTHER PUBLICATIONS

"IARC Monographs on the Evaluation of Carcinogenic Risks to Humans," (Jun. 2004) World Health Organization: International Agency for Research on Cancer vol. 88; 497 pages.

(Continued)

*Primary Examiner* — Peter A Salamon
(74) *Attorney, Agent, or Firm* — Morrison & Foerster LLP

(57) ABSTRACT

A method for producing a natural formaldehyde-free adhesive for wood panels, which improves the crosslinking reactions between the crosslinking agent and the binding agent, comprising reacting a plant protein selected from soy, lupine and legumes, together with a crosslinking agent selected from 100% of an oxidized saccharide or a combination of an oxidized saccharide and an unoxidized or pure saccharide; the method comprises the steps of: an oxidation step of a saccharide; a preparation step of plant protein, in which the plant protein is reacted with a chaotropic agent or alkali or by temperature control or a combination of these conditions; and a mixing step.

17 Claims, 2 Drawing Sheets

(56) References Cited

FOREIGN PATENT DOCUMENTS

CN         111139028 A  *  5/2020
WO    2018/215742 A1     11/2018

OTHER PUBLICATIONS

Alfian et al. (Jan. 2019). "Multi-objective optimization of green urea production," Energy Science & Engineering: Modeling and Analysis; pp. 292-304.
Heinrich, L. (Mar. 2019). "Future opportunities for bio-based adhesives—advantages beyond renewability," Green Chemistry 21; pp. 1866-1888.
Langenberg et al. (Jun. 2010). "Green Adhesives: Options for the Australian industry—summary of recent research into green adhesives from renewable materials and identification of those that are closest to commercial uptake," Forest & Wood Products Australia, Project No. PNB158-0910; 47 pages.
Liu et al. (Mar. 2010). "Biomimetic soy protein nanocomposites with calcium carbonate crystalline arrays for use as wood adhesive," Biosource Technology 101; pp. 6235-6241.
Pizzi, A. (Jan. 2015). "Wood products and green chemistry," Annals of Forest Science 73; pp. 185-203.
Zheng et al. (Apr. 2017). "Development of Defatted Soy Flour-Based Adhesives by Acid Hydrolysis of Carbohydrates," Polymers 2017 9(153); 12 pages.

\* cited by examiner

METHOD FOR PRODUCING A NATURAL FORMALDEHYDE-FREE ADHESIVE FOR WOOD PANELS

CROSS-REFERENCE TO RELATED APPLICATIONS

This application claims the priority of CL Application No. 2021-272, filed Feb. 2, 2021, the entire contents of which is incorporated herein by reference.

FIELD OF THE DISCLOSURE

The present disclosure relates to a process for manufacturing of a natural formaldehyde-free adhesive for wood panels (MDF, PB, Plywood, etc.) using plant proteins such as soy, lupine and legumes and monosaccharides or polysaccharides (hereinafter called saccharides) oxidized by 100% or a combination of oxidized and unoxidized saccharides (pure saccharide) as main agents. Panels resulting from the manufacture with this adhesive have similar or superior physical-mechanical properties to those that use commercial UF (urea-formaldehyde) resin.

BACKGROUND OF THE DISCLOSURE

Traditionally, wood-based panels are produced using thermostable resins which are manufactured mainly from formaldehyde, the most common types being urea-formaldehyde (UF), phenol-formaldehyde (PF) and melamine-urea-formaldehyde (MUF). The application of these adhesives to indoor materials may be potentially harmful due to the release of toxic substances called volatile organic compounds. Within these substances, formaldehyde is of particular interest due to its classification as carcinogenic to humans (IARC, International Agency for Research on Cancer, 2004).

In this sense, green or bio-based adhesives use renewable components potentially replacing the use of this molecule, thus becoming an alternative to reduce the demand for fossil fuels, promote sustainable development and be certified as emission-free. These bio-based adhesives, however, have a variable percentage of synthetic crosslinking agents, such as glyoxal, glutaraldehyde, isocyanates, epichlorohydrin, polyamidoamine-epichlorohydrin (PAE), epoxy resins, etc., the use of which may, in turn, be associated with toxicological risks, human health hazards, carcinogenicity or is suspected to cause cancer.

Patent Application US 2017/0107411 A1: "Bio-Adhesives" relates to the use of distiller's grains (DG) as a formaldehyde-replacement binding agent for the manufacture of a bio-based adhesive, considering as a crosslinking agent a polymeric material such as poly-isocyanates and epoxy resins in a percentage from 1% to 20%.

Patent Application WO 2018/215742 A1: "Binder Materials" relates to a method for producing an adhesive for wood products based on the use of fungi or glycans and starch as binding agents to replace formaldehyde, considering polyamidoamine-epichlorohydrin (PAE) as a crosslinking agent up to 40% by weight.

Patent Application US 2015/0086775 A1: "Soy-based adhesives with improved lower viscosity", relates to an adhesive composition using low particle size soybean meal (30 microns or smaller) as a binding agent to replace formaldehyde, for obtaining a low viscosity bio-based adhesive, also using 10% to 50% by weight PAE as a crosslinking agent.

Green Chemistry's article (2019), entitled "Future opportunities for bio-based adhesives-advantages beyond renewability", contains a review of the different bio-based material options used in adhesives, mentioning the advantages of these adhesives compared to their petroleum-based material counterparts, beyond their renewability. Among the materials described in this article is an example to overcome the inherent hydrolytic susceptibility of biopolymeric adhesives, by Zheng et al., wherein the creation of a wood adhesive entirely based on soy is mentioned, more specifically in defatted soybean meal composed of 50% soy protein and 40% carbohydrates. Moisture resistance was increased by hydrolyzing carbohydrates, causing self-crosslinking with proteins in the formulation. In another study reported by this article (Liu et al.) a water-resistant adhesive based on soy protein is shown, where calcium carbonate is introduced to obtain nano compounds.

Forest & Wood Products Australia's "Green Adhesives: Options for the Australian industry—summary of recent research into green adhesives from renewable material and identification of those that are closest to commercial uptake" (2010) relates to a review of the state of art regarding wood adhesives using renewable materials. Materials included in this review include tannins, lignin, oils, proteins (particularly soy protein). It is mentioned in this document that the use of these materials has been an area of active research for a long time, where many of the technologies are still in the pre-commercial, pilot or laboratory demonstration phase. Where technologies promoted as ready for large-scale commercial use include the Dynea AsWood technology, which incorporates a protein source with a phenol-formaldehyde resin and the Ashland/Hercules Soyad system, which is a mixture of a modified soy protein and a crosslinking agent such as polyamide-epichlorohydrin (PAE). It is noted in this review that many of these technologies still appear to be more expensive than urea formaldehyde (UF) resin systems and are only finding a niche in the market where UF resins are not allowed.

Therefore, there is still a need for developing an adhesive containing a natural binding agent, such as soybean meal, but considering at the same time an equally renewable and natural crosslinking agent to obtain an adhesive formula free of synthetic chemical compounds with potential risks to human health in order to promote sustainable development and be certified as emissions-free products.

However, the disadvantage of this type of adhesive lies in three main aspects: 1) low reactivity, 2) low mechanical properties and 3) low moisture resistance compared to synthetic adhesives. It is for this reason that the search for a natural adhesive identifies the need to improve crosslinking reactions between the natural and renewable crosslinking agent and the binding agent. In this sense, sugars (nutritional mono and disaccharides) have primary and secondary alcohol groups theoretically available for crosslinking reactions.

From the literature, oxidation with periodic acid, a periodate or peroxide salt which generate a cleavage reaction of the glycols, known as the Malaprade oxidative cleavage, has been realized as a method for improving the reactivity of these sugars and depending on the conformation of the glycols can lead to the formation of aldehyde groups. In the present disclosure, it has been shown that these aldehyde groups, in turn, can interact with amino groups present, for example, in soybean meal proteins, forming imine functional groups (Maillard reaction) which promotes crosslinking.

DETAILED DESCRIPTION OF THE DISCLOSURE

Figure 1:
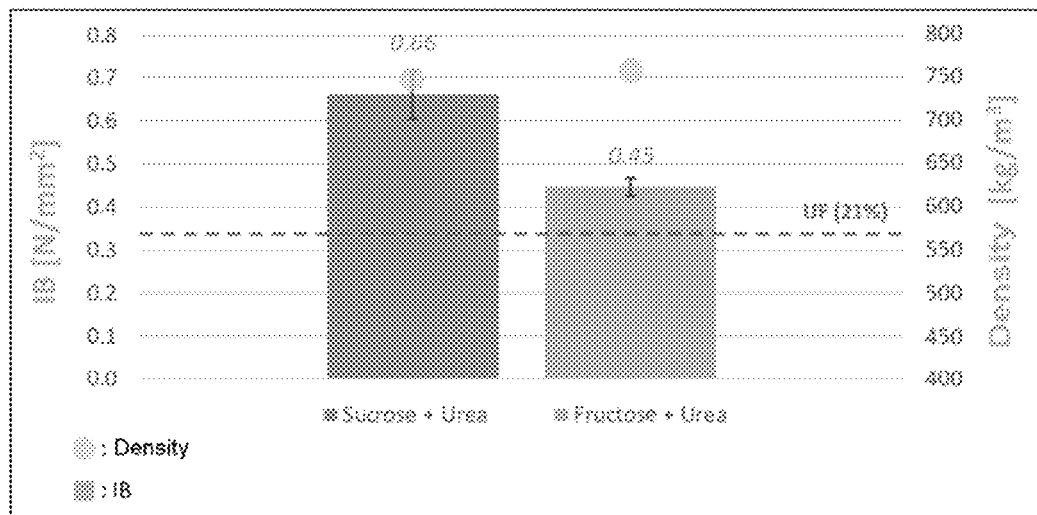
FIG. 1 depicts a graph showing IB (internal bond) values measured on MDF panels for the inventive natural adhesive based on natural proteins such as soybean meal, together with oxidized saccharides such as fructose and sucrose and using urea as a chaotropic agent.

By the present disclosure it was discovered that, by obtaining an optimum degree of reaction between a selected plant protein selected from soy, lupine and legumes and a crosslinking agent such as oxidized saccharide, a natural adhesive can be obtained whose physical-mechanical properties are equal to and even surpass those of commercial synthetic resins.

The process of the disclosure will be exemplified with soybean meal as a plant protein, however, the same process is used for other types of plant proteins. The process comprises 3 main steps:

1) Oxidation of a saccharide:
   Providing sucrose at room temperature from sugars selected from: fructose, glucose and sucrose;
   Reacting the saccharide with an oxidizing agent selected from: periodic acid, sodium metaperiodate and hydrogen peroxide, at a 1:1 to 10:1 molar ratio of oxidizing agent to the saccharide.
   Adjusting the temperature in the oxidation reaction to a range from 10 to 90° C., preferably from 20 to 40° C., adjusting the pH to a range from 1.0 to 7.0 and adjusting the reaction time to a range from 2 to 8 hours.

The pH adjustment is made by phosphoric acid or sulfuric acid for reducing it or sodium hydroxide for increasing it (in the case that hydrogen peroxide is used as an oxidizing agent).

In the case where the oxidation agent is sodium metaperiodate, due to the exothermic and kinetic nature of the reaction, the temperature must be controlled so that it does not exceed 40° C. and thus being able to control the rate of the reaction, the reaction must be further protected from light to avoid the reaction of the oxidizing agent therewith.

Optionally, the reacted saccharide is cooled in an ice-water bath (0° C.) to stop the oxidation reaction.

2) Preparation of Soybean Meal:
   The main objective of the soybean meal preparation step is to allow the opening (unfolding) of the quaternary structure of the proteins present in the meal and to increase the degree of efficiency of the subsequent crosslinking.
   Grinding the soybean meal to a fine powder, until reaching a granulometry of less than 125 µm.
   Separating the obtained powder by means of a mesh screen # (120 mesh), so that the finer fractions are separated from the thicker ones, wherein the fine fraction is carried into the process of manufacture of the natural adhesive and the coarse fraction is returned to the grinding step;
   Reacting by stirring the finer fraction of soybean meal with a chaotropic agent (protein opening agent) such as urea in a range of 50 to 100% w/w with respect to soybean meal, or with an alkali such as sodium hydroxide, by adjusting pH to a range from 9 to 12, or by controlling the temperature to a range from 40 to 90° C., or by a combination of these conditions;
   Allowing a reaction time between the components from 10 to 180 minutes, preferably from 60 to 120 minutes.
   Viscosity is controlled by the addition of rheological sulfite modifiers selected from sodium sulfite, sodium bisulfite, potassium sulfite, potassium bisulfite, ammonium sulfite, ammonium bisulfite ranging from 1 to 10% w/w to soybean meal.

In the case of urea as a chaotropic agent, it can be industrially produced from fossil sources, such as the Haber-Bosch process, wherein the required hydrogen comes from natural gas processing. However, it can be obtained through processes that do not use fossil sources, such as the catalytic reaction of oxygen with nitrogen from the air as mentioned in Pizzi, A. (2016). Wood products and green chemistry. *Annals of forest science,* 73(1), 185-203, or by green hydrogen extraction by biomass gasification, as set out in Alfian, M., & Purwanto, W. W. (2019). Multi-objective optimization of green urea production. *Energy Science & Engineering,* 7(2), 292-304, where the importance of replacing natural gas can be observed, as the price of natural gas is expected to increase in the future because it is a non-renewable resource.

3) Mixing:
   Adding the oxidized saccharide obtained at the oxidation step with the reacted soybean meal, as a solution, by means of mechanical agitation in order to maintain a homogeneous solution;
   Adjusting the pH to values between 8 and 11, preferably 10, by adding sodium hydroxide, potassium hydroxide, ammonium hydroxide or an alkali in order to increase it;
   Mixing takes place for at least 60 minutes.

Application Examples

Examples are carried out in the manufacture of MDF and PB panels, wherein the natural formaldehyde-free adhesive of the invention is applied.

The MDF (medium density fiberboard) board has the following characteristics:
Panel thickness: 12 mm.
Pressing time: 3 minutes, equivalent to a pressing factor of 15 sec/mm.
Press temperature: 200° C.
Panel density: 740-780 kg/m$^3$.
A particle board (PB) has the following characteristics:
Panel thickness: 12 mm.
Pressing time: 2 minutes, equivalent to a pressing factor of 10 sec/mm.
Press temperature: 200° C.
Panel density: 600-700 kg/m$^3$.

Example 1

Sufficient adhesive was prepared to glue 2 kg of wood fiber from mechanical refining, according to the methodology of the invention.

Sucrose>99% pure is provided in distilled water and stirred at room temperature. Sodium metaperiodate (NaIO$_4$) is added gradually at a 3:1 molar ratio of NaIO$_4$ to sucrose. The reaction is protected from light. pH is adjusted to acid values in the range of 1.0 to 3.0, by adding phosphoric acid. The oxidation reaction is carried out for 2 to 8 hours under constant agitation, obtaining an oxidized saccharide product.

Soybean meal is provided, which leads to a grinding step and then sifted through 120 mesh sizes reaching a granulometry of less than 125 μm. Water is mixed with the obtained fine soybean meal powder, sodium bisulfite 6% w/w to soybean meal and is left in constant agitation. A gradual increase in temperature is performed to a maximum of 60° C. for 120 minutes at pH 10 regulated with sodium hydroxide.

Finally, the previously oxidized sucrose solution is added to the soybean meal obtained, maintaining agitation for at least 30 minutes. A final pH adjustment between 8 and 11 is made by adding sodium hydroxide.

Wood fibers are glued by spray gluing on rotating drum for sufficient time until the adhesive has been completely dispersed. The entire adhesive preparation mentioned above is used for 2 kg of dry fiber (moisture content approximately 3%) and then dried up to a moisture value between 10% and 12% prior to entry into the hot press.

Example 2

Sufficient adhesive was prepared to glue 2 kg of wood fiber from mechanical refining, according to the methodology of the invention.

Fructose>99% pure is provided in distilled water and stirred at room temperature. Sodium metaperiodate (NaIO$_4$) is added gradually at a 2:1 molar ratio of NaIO$_4$ to fructose. The reaction is protected from light. pH is adjusted to acid values in the range of 1.0 to 3.0, by adding phosphoric acid. The oxidation reaction is carried out for 2 to 8 hours under constant agitation, obtaining an oxidized saccharide product.

Soybean meal is provided, which leads to a grinding step and then sifted through 120 mesh sizes reaching a granulometry of less than 125 μm. Water is mixed with the obtained fine soybean meal powder and is left in constant agitation. Urea is preferably added in powder as a chaotropic agent in an amount of 90% w/w to soybean meal and the solution is maintained without pH regulation, stirred for 60 minutes.

Finally, the previously oxidized fructose solution is added to the soybean meal obtained, maintaining agitation for at least 30 minutes. A final pH adjustment between 8 and 11 is made by adding sodium hydroxide.

Wood fibers are glued by spray gluing on rotating drum for sufficient time until the adhesive has been completely dispersed. The entire natural adhesive preparation mentioned above is used for 2 kg of dry fiber (moisture content approximately 3%) and then dried up to a moisture value between 10% and 12% prior to entry into the hot press.

Example 3

Sufficient adhesive was prepared to glue 2 kg of wood fiber from mechanical refining, according to the methodology of the invention.

Sucrose is provided which is dissolved in water by stirring at room temperature. 30% hydrogen peroxide is added at a 4:1 molar ratio to sucrose. The pH is adjusted to a value of 6.0 at the start of the reaction by adding NaOH. The reaction temperature is controlled to be maintained at 60° C. The oxidation reaction is carried out for 6 hours under constant agitation, obtaining an oxidized saccharide product. After the reaction time has expired, the sample is cooled in ice-water bath (0° C.) to stop the reaction.

Soybean meal is provided, which leads to a grinding step and then sifted through 120 mesh sizes reaching a granulometry of less than 125 μm. Water is mixed with the obtained fine soybean meal powder, sodium bisulfite 6% w/w to soybean meal and is left in constant agitation. A gradual increase in temperature is performed to a maximum of 60° C. for 120 minutes at pH 10 regulated with sodium hydroxide.

Finally, the previously oxidized sucrose solution is added to the soybean meal obtained, maintaining agitation for at least 30 minutes. A final pH adjustment between 8 and 11 is made by adding sodium hydroxide.

Wood fibers are glued by spray gluing on rotating drum for sufficient time until the adhesive has been completely dispersed. The entire natural adhesive preparation mentioned above is used for 2 kg of dry fiber (moisture content approximately 3%) and then dried up to a moisture value between 10% and 12% prior to entry into the hot press.

To evaluate different alternatives, panels were made with two modifications in the formulation:
1) With only 50% urea in the formulation and 100% oxidized saccharides; and
2) Oxidizing only 50% of the saccharides and then mixing them with unoxidized saccharides (pure saccharides).

Example 4

For application on PB panels, 2.3 kg of dried wood chips (moisture content approximately 3%) and the adhesive mixture described above in example 3 were used. Gluing was carried out by spraying on rotating drum spray for sufficient time to achieve complete dispersion of the natural adhesive. The glued material contains 12 to 14% humidity, and can be pressed directly, without the need for pre-drying.

The present disclosure achieves the production of a natural formaldehyde-free adhesive, whose IB values reach or exceed those made of UF resin under the same conditions of formation and pressing.

In FIG. 1, a significant difference can be observed between the IB values obtained with the formulation according to the process of Example 2, where the same procedure was performed for obtaining the natural adhesive with sucrose as oxidized saccharide instead of fructose. The dotted line represents the IB values obtained for the control panel group, wherein the adhesive comprises commercial UF resin at a gluing ratio of 21%.

The obtained panels show IB values of 0.66 N/mm$^2$ on average for sucrose with urea and 0.45 for fructose with urea, versus 0.32 N/mm$^2$ for panels with only UF resin as adhesive.

Figure 2:
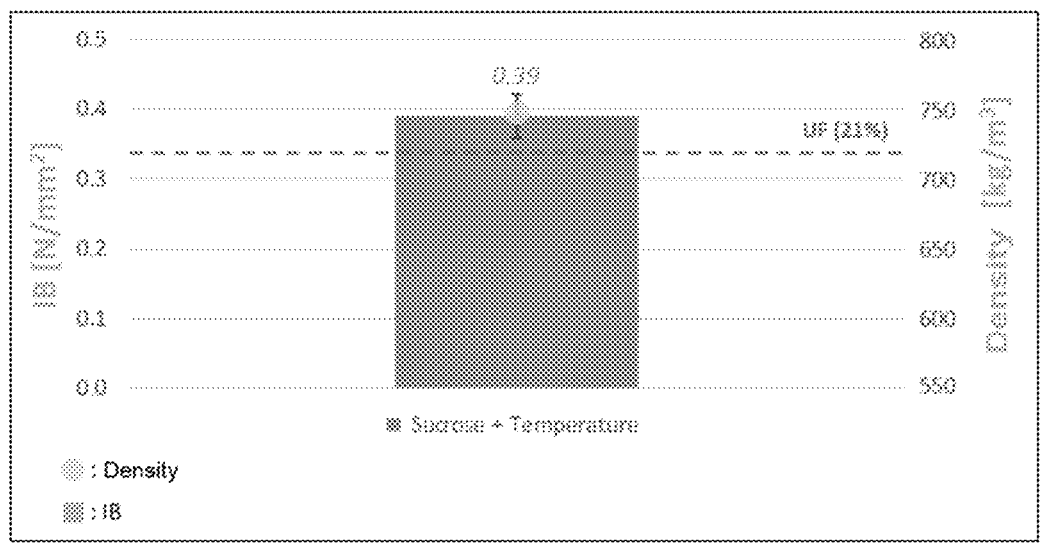
FIG. 2 also depicts IB values in MDF panels using soybean meal as plant protein and sucrose as oxidized saccharide. The formulation contains no urea and the temperature is used as an opening agent for soy proteins.

In FIG. 2, it can be observed that for the adhesive of the invention according to example 1, where sucrose is the oxidized saccharide and is used to control temperature as an opening agent of soybean meal proteins (without the use of urea as a chaotropic agent), an IB value of 0.39 N/mm$^2$ is obtained, versus 0.32 N/mm$^2$ for MDF panels with only UF resin as adhesive, wherein the adhesive is used at a gluing ratio of 21% as in FIG. 1.

Figure 3:
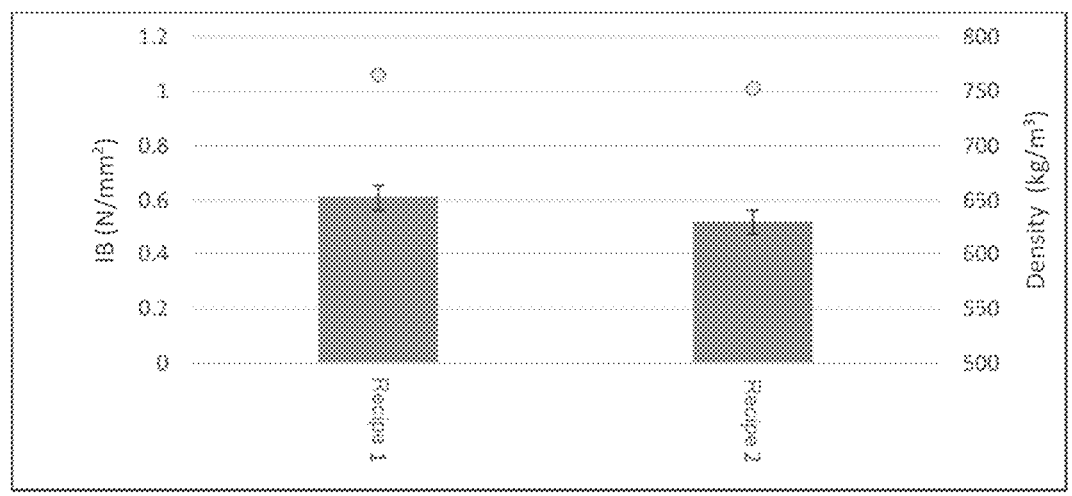
FIG. 3 shows IB values obtained in example 3 for MDF panels, the process of producing the natural adhesive for "recipe 1" panels is the same as in example 1, with the exception of the oxidizing agent used.

FIG. 3 shows the IB values obtained for example 3 for MDF panels, wherein the production process of natural adhesives for "recipe 1" panels is the same as that used in example 1, wherein the oxidation of saccharides is achieved by the addition of hydrogen peroxide instead of sodium metaperiodate (NaIO$_4$) as an oxidizing agent.

Recipe 2 corresponds to panels made with 50% less urea.

In Recipe 2, there was a slight reduction in IB (approximately 0.5 v/s 0.6 in recipe 1). However, it corresponds to a lower-cost formulation, whose mechanical properties are still above the values obtained with urea formaldehyde (UF) resins as adhesives on MDF panels.

Figure 4:
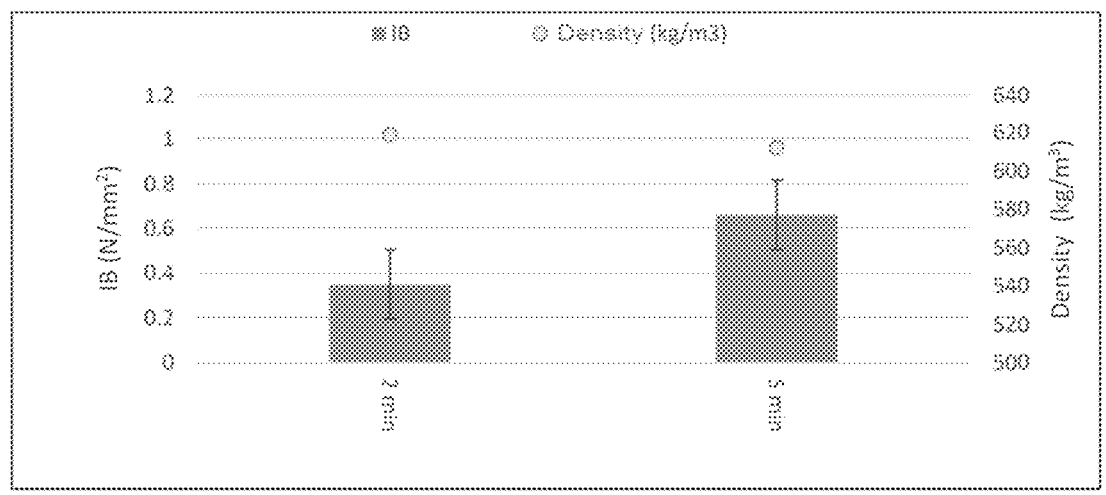
FIG. 4 shows IB values obtained in example 4 for PB. The adhesive formulation is the same as that used in example 3.

FIG. 4 shows the IB values obtained for example 4 for PB panels, wherein the production process of natural adhesives for panels is the same as that used in example 3. The panels were pressed for 2 and 5 minutes, obtaining values over 0.35 N/mm$^2$, typical value using urea formaldehyde resins.

The invention claimed is:

1. A method for producing a natural formaldehyde-free adhesive for wood panels, which improves the crosslinking reactions between the crosslinking agent and the binding agent, the method comprising reacting a plant protein from selected soy, lupine and legumes, together with a crosslinking agent selected from 100% of an oxidized saccharide or a combination of an oxidized saccharide and an unoxidized or pure saccharide; the method comprising the steps of:
   a) step of oxidation of a saccharide:
      i. providing a saccharide at room temperature;
      ii. reacting the saccharide with an oxidizing agent at a 1:1 to 10:1 molar ratio of oxidizing agent to the saccharide;
      iii. adjusting a temperature of the oxidation reaction between 10° C. and 90° C.;
      iv. adjusting a pH of the oxidation reaction between 1.0 and 7.0; and
      V. adjusting a reaction time between 2 and 8 hours;
   b) step of preparation of a plant protein:
      i. grinding the plant protein to a powder having a size of less than 125 μm;
      ii. sifting the powder to separate it into a fine fraction and a coarse fraction;
      iii. reacting the fine fraction of the powder by agitation with a chaotropic agent or alkali, by temperature control, or a combination of these conditions;
      iv. allowing a reaction time from 10 to 180 minutes;
   c) mixing step:
      i. adding the oxidized saccharide obtained from step (a) to the reacted plant protein obtained from step (b), as a solution, by means of mechanical agitation, to maintain a homogeneous solution;
      ii. adjusting a pH of the homogenous solution to a value from 8 to 11; and
      iii. mixing for at least 60 minutes.

2. The method of claim 1, wherein the saccharide is comprises one or more of fructose, glucose, or sucrose.

3. The method of claim 1, wherein the oxidizing agent from step (a) comprises one or more of periodic acid, sodium metaperiodate, or hydrogen peroxide.

4. The method of claim 1, wherein the temperature of the oxidation reaction of step (a) is from 20° C. to 40° C., and the pH of the oxidation reaction is adjusted with one or more of phosphoric acid, sulfuric acid, or sodium hydroxide.

5. The method of claim 1, wherein the oxidation reaction of step (a) is performed away from light to prevent the oxidizing agent from reacting therewith.

6. The method of claim 1, comprising cooling the reacted saccharide from step (a) in an ice-water bath (0° C.).

7. The method of claim 1, wherein the sifting from step (b) is performed with a mesh with a mesh size of 120, wherein the coarse fraction of the powder is returned to the grinding to continue processing it.

8. The method of claim 1, wherein the chaotropic agent comprises urea and is used in an amount in a range of 50-100% w/w to the plant protein.

9. The method of claim 1, wherein the alkali of step (b) comprises NaOH and is used by adjusting the pH between 9 and 12.

10. The method of claim 1, wherein the temperature control of step (b) is performed between 40° C. and 90° C.

11. The method of claim 1, wherein the reaction time of step (b) is between 60 and 120 minutes.

12. The method of claim 1, wherein in step (b) the viscosity is further controlled by the addition of rheological modifiers selected from sodium sulfite, sodium bisulfite, potassium sulfite, potassium bisulfite, ammonium sulfite, and ammonium bisulfite, in an amount between 1-10% w/w to the plant protein.

13. The method of claim 1, wherein the pH adjustment from step (c) is performed by the addition of sodium hydroxide, potassium hydroxide, ammonium hydroxide, or an alkali to increase the pH value.

14. The method of claim 1, wherein the pH adjustment from step (c) is performed at a value of 10.

15. The method of claim 1, wherein the plant protein comprises soybean meal.

16. The method of claim 1, wherein the crosslinking agent comprises 100% of the oxidized saccharide.

17. The method of claim 1, wherein the crosslinking agent comprises 50% of the oxidized saccharide and 50% of the pure saccharide.

* * * * *